United States Patent
Mizumukai

(10) Patent No.: US 8,345,287 B2
(45) Date of Patent: Jan. 1, 2013

(54) IMAGE SCANNING APPARATUS AND IMAGE SCANNING METHOD

(75) Inventor: Wataru Mizumukai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 573 days.

(21) Appl. No.: 12/410,776

(22) Filed: Mar. 25, 2009

(65) Prior Publication Data

US 2009/0244615 A1 Oct. 1, 2009

(30) Foreign Application Priority Data

Mar. 31, 2008 (JP) .................................. 2008-092534

(51) Int. Cl.
*G06F 3/12* (2006.01)
(52) U.S. Cl. ...................................................... 358/1.15
(58) Field of Classification Search .......................... None
See application file for complete search history.

(56) References Cited

U.S. PATENT DOCUMENTS

| | | | |
|---|---|---|---|
| 2006/0221407 A1 | 10/2006 | Uchida | |
| 2007/0121141 A1* | 5/2007 | Takabayashi et al. | 358/1.9 |
| 2007/0146732 A1* | 6/2007 | Piazza et al. | 358/1.1 |
| 2007/0183002 A1* | 8/2007 | Corona | 358/474 |
| 2008/0018957 A1 | 1/2008 | Suzuki | |

FOREIGN PATENT DOCUMENTS

| | | |
|---|---|---|
| JP | 09-204515 A | 8/1997 |
| JP | 09-284448 A | 10/1997 |
| JP | 2000-032203 A | 1/2000 |
| JP | 2000-115437 | 4/2000 |
| JP | 2000-270148 A | 9/2000 |
| JP | 2001-339547 | 12/2001 |
| JP | 2003-060833 A | 2/2003 |
| JP | 2004-282145 A | 10/2004 |
| JP | 2006-287389 A | 10/2006 |
| JP | 2007-300385 | 11/2007 |

OTHER PUBLICATIONS

JP Office Action dtd Feb. 4, 2010, JP Appln. 2008-092534, English translation.

* cited by examiner

*Primary Examiner* — Marivelisse Santiago Cordero
*Assistant Examiner* — John Wallace
(74) *Attorney, Agent, or Firm* — Banner & Witcoff, Ltd.

(57) ABSTRACT

An image scanning apparatus includes an input unit configured to input a scanning job, a scanning unit configured to scan a document according to the scanning job and generate image data of the document, and a storing unit configured to store the scanning job. The scanning unit performs scanning according to the scanning job inputted by the input unit and, thereafter, performs scanning according to the scanning job stored in the storing unit.

10 Claims, 11 Drawing Sheets

FIG.3

| SCANNING JOB NAME | USER ID | PASSWORD | SAVING DESTINATION TERMINAL | DATA SAVING DIRECTORY | DATA FORMAT | RESOLUTION | COLOR SETTING | DOCUMENT SIZE | DOCUMENT FEED MANNER | BRIGHTNESS | CONTRAST |
|---|---|---|---|---|---|---|---|---|---|---|---|
| CONFERENCE MINUTES | FIRST USER | aaa | PC21a | C:/DESKTOP/ CONFERENCE_MINUTES | PDF | 300dpi | MONOCHROMATIC | A4 | ADF | 50 | 50 |
| PHOTOGRAPH | FOURTH USER | ddd | PC21d | C:/DOCUMENT | JPEG | 1200dpi | COLOR | - | FB | 50 | 50 |

FIG.5

| USER ID | PASSWORD | FUNCTION | ALLOWED / NOT ALLOWED |
|---|---|---|---|
| FIRST USER | aaa | FACSIMILE TRANSMISSION FUNCTION | ALLOWED |
| | | SCANNER FUNCTION | ALLOWED |
| | | COPY FUNCTION | NOT ALLOWED |
| SECOND USER | bbb | FACSIMILE TRANSMISSION FUNCTION | NOT ALLOWED |
| | | SCANNER FUNCTION | NOT ALLOWED |
| | | COPY FUNCTION | ALLOWED |
| THIRD USER | ccc | FACSIMILE TRANSMISSION FUNCTION | ALLOWED |
| | | SCANNER FUNCTION | NOT ALLOWED |
| | | COPY FUNCTION | NOT ALLOWED |
| FOURTH USER | ddd | FACSIMILE TRANSMISSION FUNCTION | NOT ALLOWED |
| | | SCANNER FUNCTION | ALLOWED |
| | | COPY FUNCTION | ALLOWED |

FIG.8A

INPUT PASSWORD.
PASSWORD : XXXX

FIG.8B

```
SELECT SCANNING JOB.
CONFERENCE MINUTES    ▼
```

FIG.8C

SET DOCUMENT ON ADF AND
PUSH START BUTTON.

IMAGE SCANNING APPARATUS AND IMAGE SCANNING METHOD

CROSS REFERENCE TO RELATED APPLICATION

This application claims priority from Japanese Patent Application No. 2008-092534 filed Mar. 31, 2008. The entire content of this priority application is incorporated herein by reference.

TECHNICAL FIELD

The present invention relates to an image scanning apparatus and an image scanning method.

BACKGROUND

There is a known image-scanning apparatus that receives a document scanning request from an external information-processing apparatus and, using the received request, performs scanning.

However, in accordance with the known art, after the scanning is performed using the received request, the user has to transmit the document scanning request again even when scanning another document using a scanning condition that is identical with that of the previous request. This is not user-friendly and thus a problem.

Therefore, there is a need in the art for an image scanning apparatus and an image scanning method that can improve user-friendliness in performing scanning.

SUMMARY

An aspect of the present invention is an image scanning apparatus including an input unit configured to input a scanning job; a scanning unit configured to scan a document using the scanning job and generate image data of the document; and a storing unit configured to store the scanning job. The scanning unit performs scanning using the scanning job inputted by the input unit and, thereafter, performs scanning using the scanning job stored in the storing unit.

With this aspect, the storing unit stores the scanning job inputted by the input unit, so that the scanning unit can perform scanning according to the scanning job inputted by the input unit and, even thereafter, can perform scanning according to the scanning job stored in the storing unit. Therefore, the user does not have to re-input the scanning job in a case of causing scanning according to the scanning job stored in the storing unit. Therefore, with the present invention, user-friendliness in performing scanning is improved.

BRIEF DESCRIPTION OF THE DRAWINGS

FIG. 3 is a schematic view of a scanning job of the illustrative aspect in accordance with the present invention;

FIG. 5 is a schematic view of function restricting information of the illustrative aspect in accordance with the present invention;

FIG. 8A is a schematic view of a window of the illustrative aspect in accordance with the present invention;

FIG. 8B is a schematic view of a window of the illustrative aspect in accordance with the present invention; and FIG. 8C is a schematic view of a window of the illustrative aspect in accordance with the present invention.

DETAILED DESCRIPTION

<Illustrative Aspect>

An illustrative aspect in accordance of the present invention will be described with reference to FIGS. 1 through 8.

(Electrical Configuration of Image Scanning Apparatus)

Figure 1:
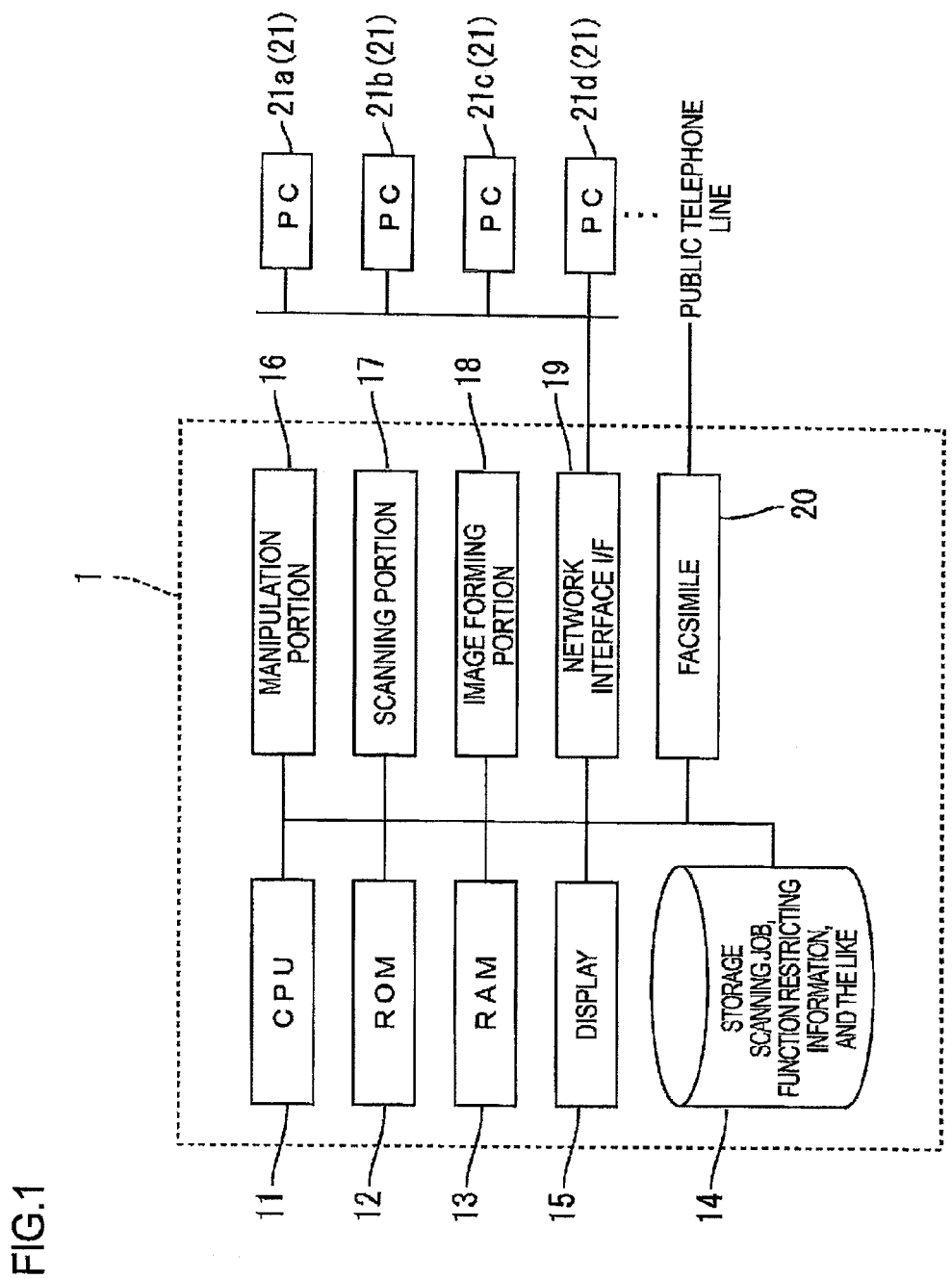
FIG. 1 is a block diagram showing an electrical configuration of an image scanning apparatus of an illustrative aspect in accordance with the present invention.

FIG. 1 is a block diagram showing an electrical configuration of a multi-function machine 1 (an illustration of an image scanning apparatus) mainly having a scanner function, a copy function, and a facsimile transmission function.

The multi-function machine 1 includes a CPU 11, a ROM 12, a RAM 13, a storage 14, a display 15, a manipulation portion 16, a scanning portion 17, an image forming portion 18, a network interface (I/F) 19, and a facsimile transmitting and receiving portion 20.

The CPU 11 executes programs stored in the ROM 12 and thereby controls each portion of the multi-function machine. Thus, the CPU 11 functions as an input unit, a scanning unit, a storing unit, a transmission unit, a scanning job selection unit, a display unit, a deleting unit, an authentication-information input unit, an operation-mode selection unit, a switching unit, and an authenticating unit.

The storage 14 (an illustration of the storing unit and the deleting unit) is an external storage device having a hard disk, a flash memory, or the like as a storage medium. The storage 14 stores scanning jobs (described below) received from personal computers (each of which hereinafter referred to as the "PC") 21, function restricting information for restricting usable functions for each user, and other types of information. Note that the storage 14 may also be a USB mass-storage device (such as a USB memory or a USB hard disk) detachably connected to the multi-function machine 1.

Note in this illustrative aspect that while the scanning jobs are stored illustratively in a nonvolatile storage medium such as the hard disk and the flash memory, the scanning jobs may be stored in a volatile storage medium such as the RAM 13.

The display 15 (an illustration of the scanning job selection unit, the display unit, the authentication-information input unit, and the operation-mode selection unit) is configured by a display device such as a liquid crystal display. The display 15 is controlled by the CPU 11 to display various types of information.

The manipulation portion 16 (an illustration of the scanning job selection unit, the authentication-information input unit, and the operation-mode selection unit) is configured by a plurality of manipulation switches such as a start button for commanding start of scanning. The user can manipulate the manipulation portion 16 while viewing, for example, windows displayed on the display 15. Thus, manipulations such as each kind of setting, selection of a scanning job, and input of a password (an illustration of the authentication information) can be performed.

The scanning portion 17 (an illustration of the scanning unit) is a so-called flatbed scanner and includes a line sensor such as a CIS (contact image sensor). The scanning portion 17 also includes a platen, and an automatic document feeder (ADF), which are not illustrated. The scanning portion 17, using the line sensor, performs scanning of a document placed on the platen or conveyed to a scanning position by the automatic document feeder and thereby generates image data.

The image data represents an image. The image forming portion 18 prints the image on a recording medium (e.g. a sheet) by laser or by inkjet.

The network interface 19 (an illustration of the input unit and the transmission unit) is connected to the PCs 21 through electrical telecommunication lines (e.g. a LAN or the Internet).

The facsimile transmitting and receiving portion 20 performs facsimile transmission and reception of the image data between other facsimile devices via phone lines.

(Electrical Configuration of PC)

Figure 2:
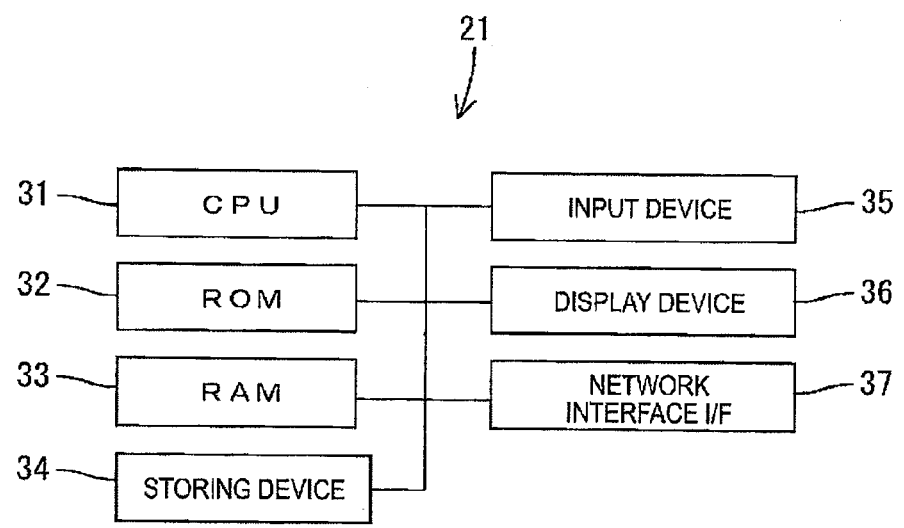
FIG. 2 is a block diagram of an information terminal apparatus of the illustrative aspect in accordance with the present invention.

FIG. 2 is a block diagram showing an electrical configuration of the PC 21 (an illustration of an information terminal apparatus). The PC 21 is configured by a CPU 31, a ROM 32, a RAM 33, a storing device 34 having a hard disk or an optical disk as a storage medium, an input device 35 (e.g. a keyboard and/or a mouse), a display device 36 (e.g. a liquid crystal display or a CRT (Cathode Ray Tube)), and a network interface 37, which are connected with buses.

(Outline of Process Performed by Multi-Function Machine and PC)

The PC 21 runs a scanner driver stored in the storing device 34 and thereby displays a job-setting window on the display device 36. The job-setting window is displayed for the user to perform scanning job setting. When the scanning job is set by the user, the PC 21 transmits the set scanning job to the multi-function machine 1.

Upon receipt of each scanning job from the PC 21, the multi-function machine 1 stores each received scanning job in the storage 14. Then, the multi-function machine 1 scans a document according to one of the scanning jobs stored in the storage 14 to generate image data of the document, and transmits the image data to the PC 21. Note that one of the scanning jobs can be selected by the user through the manipulation portion 16.

(Scanning Job)

FIG. 3 is a schematic view showing an illustration of the scanning jobs. In this illustrative aspect, each scanning job is a piece of information that defines a series of operations for scanning a document. Each scanning job includes a scanning job name, user ID and password of a user who has set the scanning job, a scanning condition for scanning a document (including at least one of the following: a data format, resolution, a color setting, a document size, a document feed manner, brightness, and contrast), and a processing condition related to transmission of image data for the document (a saving destination terminal and a data saving directory).

An arbitrary character string can be set as the scanning job name. The arbitrary character string is inputted by the user to uniquely distinguish the scanning job. Note that the user can input any scanning job name (thus, making it easy to comprehend for the user). For example, in a case of setting a scanning job for scanning a document having conference minutes printed thereon, the user can input "Conference Minutes" and, in a case of setting a scanning job for scanning a photograph, the user can input "Photograph". This makes it easier for the user to find a desired scanning job when selecting the desired scanning job on the multi-function machine 1.

Set as the user ID is unique identification information that is assigned in advance to the user who has inputted this scanning job.

Set as the password is authentication information for authenticating personal identification of the user who has inputted this scanning job. The password serves to block unauthorized users, except the user who has inputted this scanning job, from using this scanning job.

Set as the saving destination terminal is an address (an IP address, a domain name, or the like) of the PC 21 to which image data generated from a document scanned according to the scanning job is to be transmitted.

Set as the data saving directory is a name of a directory that is located in the PC 21 designated as the saving destination terminal and is for saving the data. The image data transmitted from the multi-function machine 1 is saved in the directory designated as the data saving directory.

Set as the data format is one of a plurality of data formats (e.g. PDF, JPEG, TIFF, and bitmap). In a case where the document is scanned according to this scanning job in the multi-function printer 1, the image data in the set format is generated.

Set as the resolution is one of a plurality of resolution values that are set in advance (e.g. 300 dpi (dots per inch) and 1200 dpi). In a case where the document is scanned according to the scanning job in the multi-function printer 1, the image data with the set resolution value is generated.

Set as the color setting is one of image types that are set in advance (e.g. color image, gray scale image, monochromatic image, text, and custom). In a case where the document is scanned according to the scanning job in the multi-function printer 1, the image data with the set color setting is generated.

Set as the document size is one of a plurality of sizes that are set in advance (e.g. ISO A4 size, ISO A3 size, and JIS (Japanese Industrial Standards) B5 size). In a case where the document is scanned according to the scanning job in the multi-function printer 1, the image data is generated in accordance with the set size.

Set as the document feed manner is a manner whereby the document is fed. In this illustrative aspect, FB (flat bed) is set in a case where the document placed on the platen is to be scanned, while ADF (automatic document feeder) is set in a case where the document conveyed to the scanning position by the automatic document feeder is to be scanned.

Set as the brightness is a value that represents a degree of image brightness. In a case where the document is scanned according to the scanning job in the multi-function printer 1, the image data is generated in the set brightness value.

Set as the contrast is a value that represents a difference between the darker and lighter parts of an image, i.e. a degree of contrast. In a case where the document is scanned according to the scanning job in the multi-function printer 1, the image data with the set contrast value is generated.

Note that the scanning condition included in the scanning job is not limited to that as above; the scanning condition may be varied as necessary. Furthermore, the process condition for the image data is not limited to the process condition related to the transmission process. The process condition for the image data may be related to, for example, printing (e.g. the number of copies to print, color or monochrome, and single-sided or double-sided printing), and facsimile transmission (e.g. a facsimile number)

(Scanning Job Setting)

Next, an illustration of a job-setting window displayed by the PC 21 will be described with reference to FIGS. 4A and 4B.

Figure 4A:
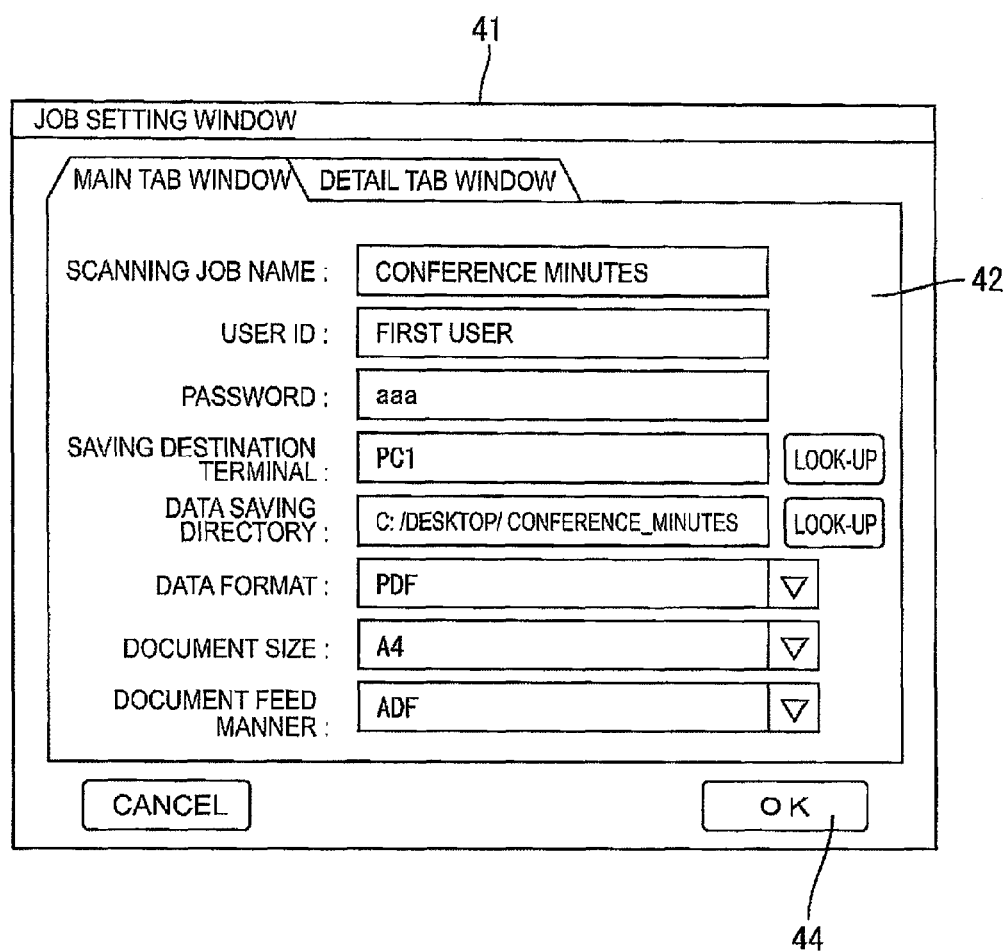
FIG. 4A is a schematic view of a job setting window of the illustrative aspect in accordance with the present invention.
Figure 4B:
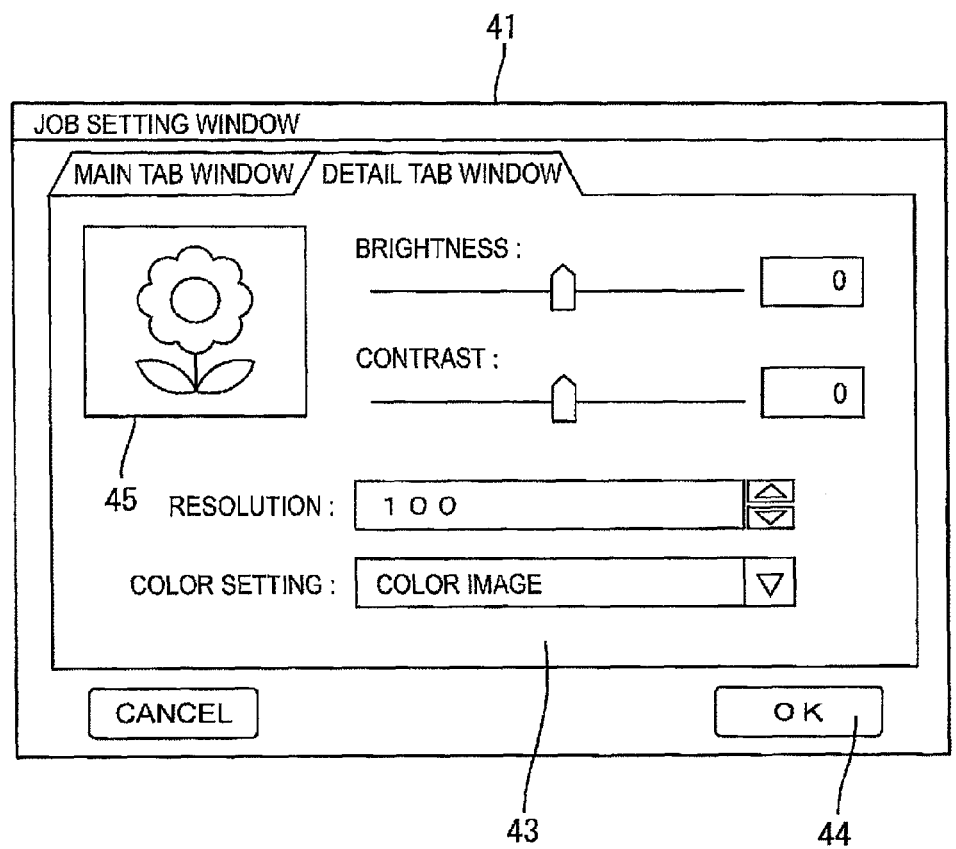
FIG. 4B is another schematic view of the job setting window of the illustrative aspect in accordance with the present invention.

A job-setting window 41 is configured by a main tab window 42 as shown in FIG. 4A and a detail tab window 43 as shown in FIG. 4B. As shown in FIG. 4A, set in the main tab window 42 are the scanning job name, the user ID, the password, the saving destination terminal, the data saving directory, the data format, the document size, and the document-feed manner. As shown in FIG. 4B, set in the detail tab window 43 are the brightness, the contrast, the resolution, and the color settings. Changes of the values of the brightness and the contrast are reflected in a sample image 45. The user thus can set the values while checking results of the change by the sample image 45.

The user manipulates the input device 35 and thereby sets a scanning job on the job-setting window 41, and presses an OK button 44. Upon press of the button, the PC 21 transmits the set scanning job to the multi-function machine 1.

The scanning job that can be transmitted to the multi-function machine 1 is not limited to a single job; the user can repeat the manipulation on the job-setting window 41 and thereby transmit a plurality of scanning jobs having respective scanning conditions different from each other.

(Function Restriction for Each User)

Next, a function restriction for each user will be described.

Since important information tends to be sent to the multi-function machine 1, it is undesirable to allow any person to freely use the multi-function machine 1. In order to avoid this, the multi-function machine 1, when the function restriction is in operation, does not allow free use of these functions, i.e. restricts functions allowed for use for each user. The multi-function machine 1 stores function restricting information in the storage 14. This information defines corresponding relation between each user ID, a respective password, and "allowed"/"not allowed" for each function. The function restriction is operated for each user using this function restricting information.

An illustration of the function restricting information will be described with reference to FIG. 5. For example, a first user is allowed to use the scanner function and the facsimile transmission function but not allowed to use the copy function. On the other hand, for example, a second user is not allowed to use the scanner function and the facsimile transmission function but allowed to use the copy function. Each of a third user and a fourth user also is allowed, or is not allowed, to use each function in the similar manner.

Note here that the "scanner function" is a function to perform scanning using the scanning portion 17, generate image data, and transmit the generated image data to the saving destination terminal.

Note also that the "facsimile transmission function" is a function to perform scanning using the scanning portion 17, generate image data, and facsimile transmit the generated image data using the facsimile transmitting and receiving portion 20.

Likewise, the "copy function" is a function to perform scanning using the scanning portion 17, generate image data, and print the image data using the image forming portion 18.

(Process Performed by Multi-Function Machine)

Next, a process performed by the multi-function machine 1 will be described. Described in this illustrative aspect will be a process in which the multi-function machine 1 receives a scanning job from the PC 21 and performs scanning of a document according to the received scanning job in the case where the function restriction is in operation.

(Process of Receiving Scanning Job from PC)

Figure 6:
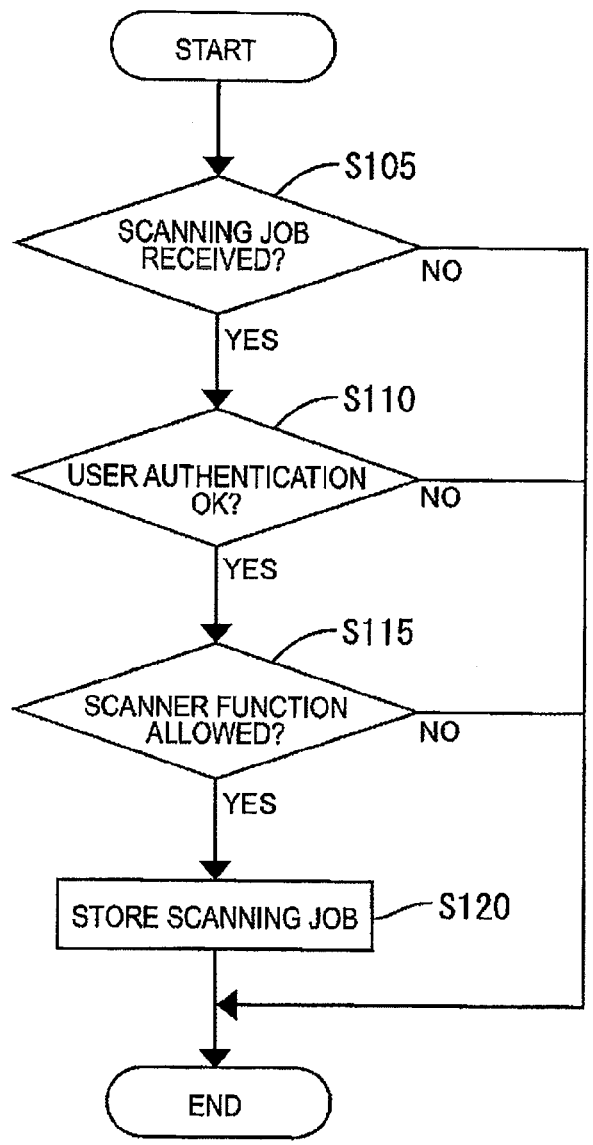
FIG. 6 is a flowchart of the illustrative aspect in accordance with the present invention.

FIG. 6 is a flow chart of a process of receiving a scanning job from the PC 21 in the case where the function restriction is in operation. This process is repeatedly executed at predetermined time intervals after the multi-function machine 1 is powered on.

In S105, the CPU 11 determines if a scanning job has been received through the network interface 19. When the scanning job has been received, the process goes to S110. When the scanning job has not been received, the process is terminated.

In S110, the CPU 11 determines if the user ID and the password provided in the received scanning job match a user ID and its corresponding password defined or registered in the function restricting information. When the user ID and the password are registered, the process goes to S115. When the user ID and the password are unregistered, authentication failure is determined, and the process is terminated.

In S115, the CPU 11 refers to the function restricting information to determine if the scanner function is allowed with respect to the user ID provided in the scanning job. When the function is allowed, the process goes to S120 or, when it is not allowed, the process is terminated.

In S120, the CPU 11 stores the received scanning job in the storage 14.

(Process of Scanning a Document Using a Scanning Job)

Figure 7:
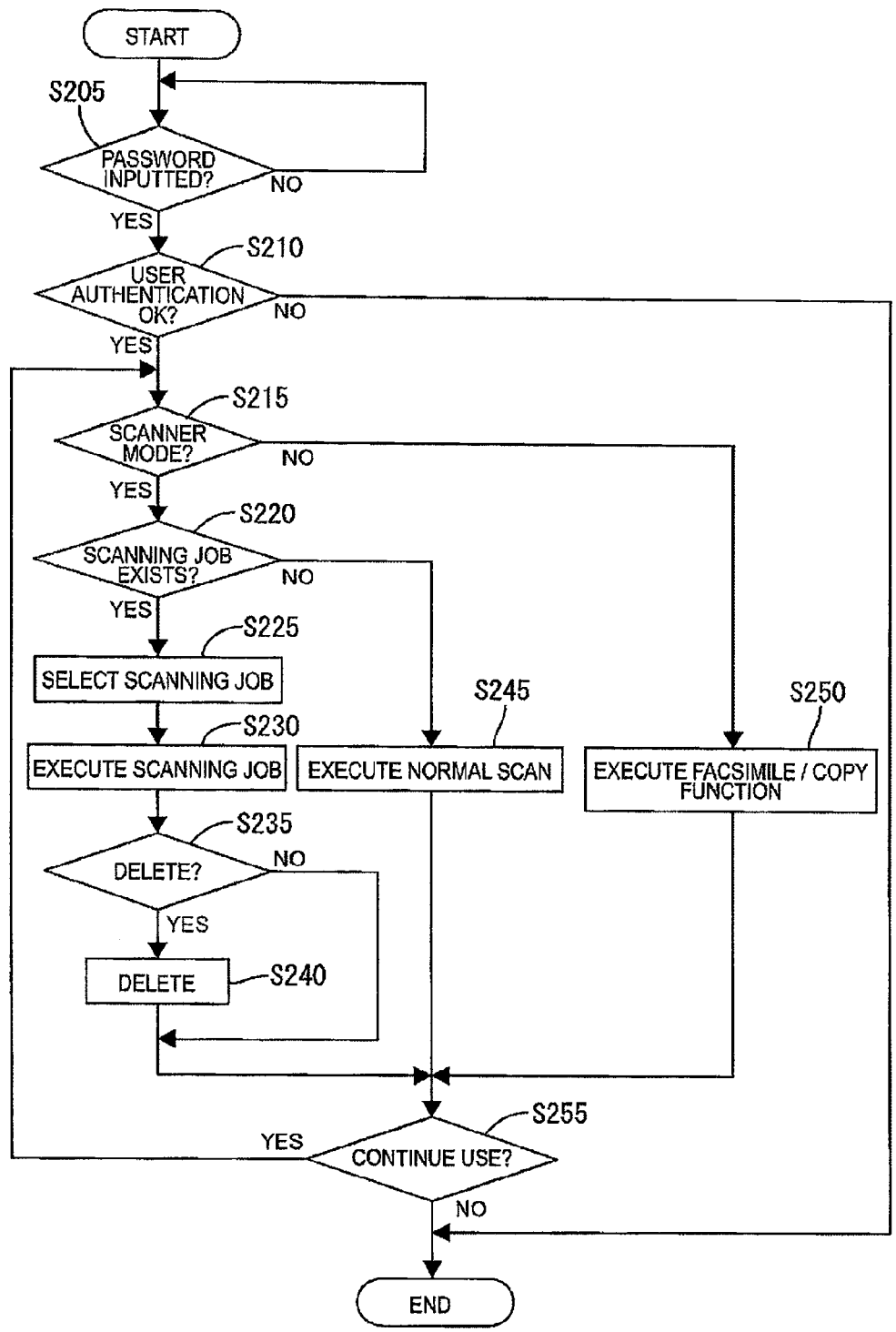
FIG. 7 is a flowchart of the illustrative aspect in accordance with the present invention.

FIG. 7 is a flowchart of a process of scanning a document according to the scanning job in the case where the function restriction is in operation. This process is repeatedly executed at predetermined time intervals after the multi-function machine 1 is powered on.

Note here that the multi-function machine 1 includes three operation modes of a scanner mode, a facsimile transmission mode, and a copy mode.

The scanner mode is a mode for using the scanner function. In the scanner mode, when the scanning job is stored in the storage 14, scanning is performed according to the scanning job. The facsimile transmission mode is a mode for using the facsimile transmission function, while the copy mode is a mode for using the copy function.

Figure 8A:
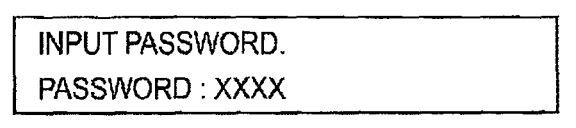

In S205, the CPU 11 displays a window for password inputting manipulation in the display 15, as illustrated in FIG. 8A. The CPU 11 determines at constant time intervals if a password inputting manipulation has been performed. When password inputting manipulation has been performed, the process goes to S210. When password inputting manipulation has not been performed, the determination is performed again after a lapse of a constant time.

In S210, the CPU 11 determines if the password inputted in S205 is registered in the function restricting information. When the matching password is registered, the CPU 11 further determines if at least one of the operation modes (the scanner mode, the facsimile transmission mode, and the copy mode) is allowed for use. For example, if the scanner function is allowed for use, the CPU 11 determines that the scanner mode is allowed for use; if the facsimile transmission function is allowed for use, the CPU 11 determines that the facsimile transmission mode is allowed for use. Determination concerning the copy mode is also likewise performed.

In this illustrative aspect, the password inputted in S205 can be used not only as the password for authenticating the allowed operation mode but also as a password for authenticating the scanning job allowed for use. That is, it is unnecessary for the user to separately perform password inputting manipulation for authentication of the scanning job and password inputting manipulation for authentication of the allowed operation mode, i.e. password inputting operation may be performed once. This provides for a more user-efficient configuration.

When the inputted password is registered in the function restricting information and, further, at least one of the operation modes is allowed for use in S210, the process goes to S215. On the other hand, when the password is not registered or when no operation mode is allowed for use, the CPU 11 terminates the process.

In S215, the CPU 11 displays a menu for the user to select one of the operation modes (the scanner mode, the facsimile transmission mode, and the copy mode) on the display 15.

In this menu display, the CPU 11 excludes the operation mode that corresponds to the function which this user is not allowed to use. Accordingly, the user cannot select the operation mode that corresponds to the function which the user is not allowed to use.

In this illustrative example, when the scanner mode is selected in S215, the process goes to S220. On the other hand, when the facsimile transmission mode or the copy mode is selected, the process goes to S250.

In S220, the CPU 11 performs search in the storage 14 to determine if a scanning job (provided with the password matching with the inputted password) is stored. When the scanning job provided with the password matching with the inputted password is stored, the process goes to S225. On the other hand, when such a scanning job is not stored, the process goes to S245.

Figure 8B:
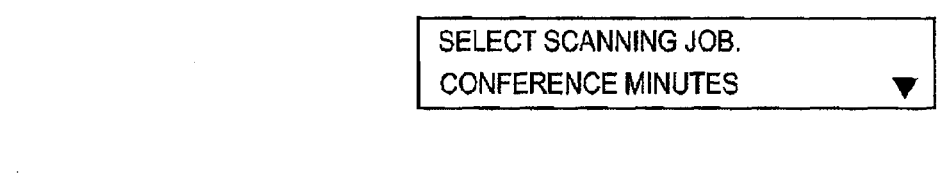

In S225, the CPU 11 displays a window as illustrated in FIG. 8B on the display 15 to cause the user to select a scanning job. After manipulation of the manipulation portion 16 by the user, scanning jobs provided with the password matching with the inputted password are displayed in the scrollable window shown in FIG. 8B on the display 15. The user then selects a desired scanning job by scrolling the display to the desired one.

The scroll display in the window shown in FIG. 8B includes the scanning jobs provided with the password matching with the inputted password, while excluding the other scanning jobs. Accordingly, the user cannot use scanning jobs inputted by other users, and the scanning jobs inputted by this user are likewise not able to be used by other users.

Figure 8C:
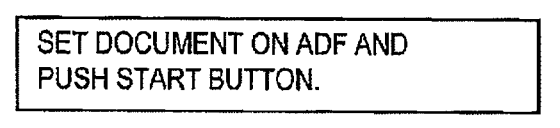

In S230, the CPU 11 displays a window as illustrated in FIG. 8C in the display 15 to ask the user to press the start button. When the start button is pressed by the user and thereby a start of scanning is commanded, the CPU 11 scans a document according to the scanning job selected by the user, and generates image data of the document. Next, the CPU 11 transmits the generated image data to the PC 21 designated as the saving destination terminal in this scanning job.

Here, suppose in S230 a case where, for example, there are a plurality of scanning jobs selectable by the user who is starting scanning and, further, the user has a plurality of documents (each document may include a plurality of sheets) to be scanned according to each scanning job in his/her hands. Even in this case, if each of the scanning job names displayed on the display 15 represents a document character (e.g. "Conference Minutes"), the user can easily select a document suitable for the selected scanning job and set the document on the scanning portion 17.

In S235, the CPU 11 asks the user if it is desired to delete the scanning job used for the scanning in S230. When "Yes" is selected, the process goes to S240. When "No" is selected, the process goes to S255.

In S240, the CPU 11 deletes the scanning job used for the scanning in S230 from the storage 14. In a case where there is no schedule of performing scanning according to this scanning job in the near future, this scanning job can be deleted to efficiently use the storage 14.

In S245, the CPU 11 executes normal scanning. Note that normal scanning in this illustrative aspect is not the process of scanning a document according to a scanning job stored in the storage 14 but a process of scanning a document using values that are set by manipulating the manipulation portion 16 on the multi-function machine 1.

In S250, the CPU 11 executes the facsimile transmission function or the copy function that corresponds to the operation mode that the user selects.

In S255, the CPU 11 asks if the user would like to further use the multi-function machine 1. When "Yes" is selected, the process returns to S215 to repeat the process. When "No" is selected, the process is terminated.

With the above-described multi-function machine 1 of this illustrative aspect in accordance with the present invention, the CPU 11 stores a scanning job in S120, scans a document according to the scanning job in S230 and, thereafter, when "No" is selected in S235, leaves the scanning job in the storage 14. The scanning job is selectably displayed when the scanner mode is selected next time and, when the user again selects this scanning job, scanning is executed again according to this scanning job.

Thus, with the multi-function machine 1, even after scanning of a document is performed by the scanning portion 17 according to a scanning job inputted by the network interface 19, the scanning job is stored in the storage 14. Then, the scanning portion 17 can perform scanning of another document according to this scanning job stored in the storage 14.

That is, with the multi-function machine 1, scanning can be re-executed according to the scanning job stored in the storage 14. In the case of scanning another document according to the scanning job stored in the storage 14, the user does not have to re-input the scanning job. Therefore, the multi-function machine 1 improves user-friendliness when performing scanning.

Furthermore, with the multi-function machine 1, the scanning job can be inputted from the PC 21, and the image data generated according to this scanning job can be transmitted to the PC 21. This improves user-friendliness for the user who wants to use the image data, which is generated by document scanning operation, in the PC 21.

Furthermore, with the multi-function machine 1, the plurality of scanning jobs that have the respective scanning conditions different from each other can be stored. The user can select a scanning job suitable for the current purpose from the stored scanning jobs and perform scanning. This improves user-friendliness in the case where different types of documents needs to be scanned according to their corresponding scanning conditions different from each other.

For example, in a case where the user wishes to scan a document using the different scanning conditions, the user can store the plurality of scanning jobs having respective scanning conditions different from each other. Thus, the user does not have to repeat a series of actions, previously input, from an action to transmit a scanning job, which is configured with one of the stored scanning conditions, from the PC 21 to an action to put the document in the multi-function machine 1. Therefore, user-friendliness is much more improved. Specifically, in a case where the distance between the PC 21 and the multi-function machine 1 is larger, the user is free from burden of coming and going between these two apparatuses and, therefore, this increases user-friendliness.

<Other Illustrative Aspects>

The present invention is not limited to the above description with reference to the drawings; for example, the following illustrative aspects may be included within the scope of the invention.

(1) In the above illustrative aspect, a scanning job is inputted illustratively via the network. It may be arranged so that the user inputs a scanning job directly to the multi-function machine 1 by manipulating the manipulation portion 16 of the multi-function machine 1.

(2) In the above illustrative aspect, the menu for selecting one of the scanner mode, the facsimile transmission mode, and the copy mode is displayed in S215. It may be arranged so as to automatically switch to the scanner mode in the case where the scanning job provided with the password matching with the inputted password is stored in the storage 14.

By automatically switching to the scanner mode, the user does not have to perform the manipulation to select the operation mode on the manipulation portion 16 at least when performing document scanning operation according to the scanning job stored in the storage 14. This improves user-friendliness.

(3) In the above illustrative aspect, the multi-function machine 1 executes the scanning job selected by the user. This configuration is not limited by the need of execution specifically by the user, rather each received scanning job can be automatically executed in the order received.

Also in this case, the scanning job names may be displayed on the display 15. If the scanning job names are displayed on the display 15, the user can check the order in which the scanning jobs are executed.

(4) In the above illustrative aspect, the function restriction is illustratively in operation in the multi-function machine 1. The present invention can be configured so that the function restriction can be turned off and, when the function restriction is off, the process as described in the above illustrative aspect is changed so that all functions can be available to all users.

(5) In the above illustrative aspect, the scanning job used for scanning performed in S240 is deleted from the storage 14. It may be arranged so that a user must select a specific scanning job to be deleted and then delete the scanning job selected by the user.

(6) In the above illustrative aspect, the multi-function machine 1 illustratively includes the scanner function, the copy function, and the facsimile transmission function. The multi-function machine 1 may further includes other functions such as a print function for printing image data received from the PC. Furthermore, the function restriction may be placed on these functions.

(7) In the above illustrative aspect, when it is determined in S220 that the scanning job is stored, the process goes to S225 to cause the user to perform the scanning job selection. It may be arranged as follows: when it is displayed on the display 15 if use of the stored scanning job is wanted; when "Yes" is selected, the process goes to S225; on the other hand, when "No" is selected, the process goes to S235 to execute normal scanning. With this arrangement, when the user wants to perform normal scanning in spite that the scanning job is stored, the user can select "No" and thereby perform normal scanning.

What is claimed is:

1. An image scanning apparatus comprising:
    a scanning unit configured to scan a document to generate image data;
    a storage configured to store one or more scanning jobs;
    a processor; and
    memory storing computer-executable instructions that, when executed, cause the processor to:
    receive authentication information inputted by a user;
    display a menu configured to allow a user to select one of a plurality of operation modes;
    determine whether the inputted authentication information matches authentication information of one of the one or more scanning jobs stored in the storage;
    automatically select a scanner mode from among the plurality of operation modes directly in response to determining that the inputted authentication information matches the authentication information of one of the one or more scanning jobs stored in the storage so that a user does not have to select the scanner mode from the menu;
    require a user to select one of the operation modes in response to determining that the inputted authentication information does not match the authentication information of one of the one or more scanning jobs stored in the storage;
    cause the scanning unit to scan the document according to a particular scanning job from among the one or more scanning jobs stored in the storage;
    request a user to make a selection indicating whether to delete the particular scanning job in response to scanning the document according to the particular scanning job; and
    delete the particular scanning job from the storage based on the selection indicating that the particular scanning job is to be deleted,
    wherein each of the one or more scanning jobs includes a piece of information that defines a series of operations for scanning a document, the information including at least one of a data format, resolution, a color setting, a document size, a document feed manner, brightness, and contrast.

2. The image scanning apparatus according to claim 1, further comprising a transmission unit,
    wherein the processor functions as an input unit to receives the particular scanning job from an information terminal apparatus, and the transmission unit is configured to transmit image data generated according to the particular scanning job stored in the storage to the information terminal apparatus.

3. The image scanning apparatus according to claim 1,
    wherein the one or more scanning jobs have respective scanning conditions that are different from each other.

4. The image scanning apparatus according to claim 3,
    wherein the memory further includes computer-executable instructions that, when executed, further cause the processor to select at least one of the one or more scanning jobs stored in the storage based on a user input,
    wherein the scanning unit performs scanning according to the at least one of the one or more scanning jobs selected.

5. The image scanning apparatus according to claim 3 further comprising a display unit,
    wherein the one or more scanning jobs have respective scanning job names, and the display unit is configured to display the scanning job names.

6. The image scanning apparatus according to claim 5, wherein the processor functions as an input unit to receive each of the scanning job names.

7. The image scanning apparatus according to claim 1,
    wherein the plurality of operation modes comprises a facsimile transmission mode, a copy mode, and the scanner mode.

8. The image scanning apparatus according to claim 1,
    wherein the memory further includes computer-executable instructions that, when executed, further cause the processor to determine whether the scanning unit is allowed to perform scanning based on the inputted authentication information.

9. The image scanning apparatus of claim 1, wherein the storage is detachably connected to the processor.

10. An image scanning method using an information terminal apparatus and an image scanning apparatus that are communicatively connected to each other, the method comprising the steps of:

- transmitting a scanning job from the information terminal apparatus to the image scanning apparatus;
- storing the scanning job in a storage of the image scanning apparatus;
- receiving authentication information inputted by a user;
- determining whether the inputted authentication information matches the authentication information of one of the one or more scanning jobs stored in the storage;
- automatically selecting a scanner mode from among the plurality of operation modes directly in response to determining that the inputted authentication information matches the authentication information of one of the one or more scanning jobs stored in the storage;
- receiving a command to start scanning in the image scanning apparatus;
- scanning a document according to the scanning job stored in the storage and generating image data of the document in the image scanning apparatus;
- requesting a user to make a selection indicating whether to delete the scanning job in response to scanning the document according to the scanning job;
- deleting the scanning job from the storage of the image scanning apparatus based on the selection indicating that the scanning job is to be deleted; and
- transmitting the image data to the information terminal apparatus, wherein the scanning job includes a piece of information that defines a series of operations for scanning a document, the information including at least one of a data format, resolution, a color setting, a document size, a document feed manner, brightness, and contrast.

* * * * *

UNITED STATES PATENT AND TRADEMARK OFFICE
CERTIFICATE OF CORRECTION

PATENT NO.         : 8,345,287 B2
APPLICATION NO.    : 12/410776
DATED              : January 1, 2013
INVENTOR(S)        : Wataru Mizumukai It is certified that error appears in the above-identified patent and that said Letters Patent is hereby corrected as shown below:

In the Claims

Column 10, Claim 2, Line 34:
    Please delete "receives" and insert --receive--

Signed and Sealed this
Fourth Day of February, 2014

Michelle K. Lee
*Deputy Director of the United States Patent and Trademark Office*